United States Patent
Ould-Brahim et al.

(10) Patent No.: US 9,106,583 B2
(45) Date of Patent: *Aug. 11, 2015

(54) LAYER-2 TO MPLS SERVICE MEDIATION ARCHITECTURE

(71) Applicant: RPX Clearinghouse LLC, San Francisco, CA (US)

(72) Inventors: Hamid Ould-Brahim, Kanata, CA (US); Elizabeth Hache, Kanata, CA (US); Jeffrey Sugimoto, Ottawa, CA (US); Gregory Wright, Sittsville, CA (US)

(73) Assignee: RPX Clearinghouse LLC, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/087,211

(22) Filed: Nov. 22, 2013

(65) Prior Publication Data

US 2014/0079069 A1 Mar. 20, 2014

Related U.S. Application Data

(63) Continuation of application No. 13/566,221, filed on Aug. 3, 2012, now Pat. No. 8,594,097, which is a continuation of application No. 11/167,883, filed on Jun. 27, 2005, now Pat. No. 8,289,964.

(60) Provisional application No. 60/583,381, filed on Jun. 28, 2004.

(51) Int. Cl.
*H04L 12/28* (2006.01)
*H04L 12/723* (2013.01)
(Continued)

(52) U.S. Cl.
CPC .......... *H04L 45/50* (2013.01); *H04L 12/4633* (2013.01); *H04L 29/12009* (2013.01);
(Continued)

(58) Field of Classification Search
CPC ... H04L 12/28; H04L 61/406; H04L 61/6004; H04L 61/604

USPC .......... 370/395.5, 395.51, 395.53, 401, 466, 370/392, 467

See application file for complete search history.

(56) References Cited

U.S. PATENT DOCUMENTS

| 5,400,325 A | 3/1995 | Chatwani et al. |
| 6,611,532 B1 | 8/2003 | Madour et al. |

(Continued)

FOREIGN PATENT DOCUMENTS

| EP | 1 388 979 A1 | 11/2004 |
| JP | 2002164937 A | 6/2002 |

OTHER PUBLICATIONS

Supplementary Search Report, corresponding Application No. 05761908.2-1249 / 1766856 PCT/CA2005/001006, Oct. 6, 2009, 4 pages.

(Continued)

*Primary Examiner* — Dady Chery
(74) *Attorney, Agent, or Firm* — Christopher & Weisberg, P.A.

(57) ABSTRACT

An architecture for providing service mediation in a network having a Layer-2 domain and an MPLS domain includes at least one Layer-2 provider edge device in communication with a first customer site; at least one Layer-2 edge device in communication with the Layer-2 provider edge device; at least one MPLS mediation edge device in communication with the Layer-2 edge device; and at least one MPLS provider edge device in communication with both the MPLS mediation edge device and a second customer site. An end-to-end connection is established using native Layer-2 signaling, if any, in the Layer-2 domain and PWE3 signaling protocols in the MPLS domain. The MPLS mediation edge device resolves associations between Layer-2 edge devices and MPLS provider edge devices. The service is "mediated" in the sense that native Layer-2 signaling is terminated at the MME, and a new domain, i.e., pseudowire, is established across the MPLS domain.

29 Claims, 5 Drawing Sheets

(51) Int. Cl.
  *H04L 12/46* (2006.01)
  *H04L 29/12* (2006.01)
  *H04L 12/751* (2013.01)

(52) U.S. Cl.
  CPC .... *H04L29/12028* (2013.01); *H04L 29/12801* (2013.01); *H04L 29/12877* (2013.01); *H04L 45/10* (2013.01); *H04L 45/502* (2013.01); *H04L 61/103* (2013.01); *H04L 61/106* (2013.01); *H04L 61/6004* (2013.01); *H04L 61/604* (2013.01)

(56) References Cited

U.S. PATENT DOCUMENTS

| | | |
|---|---|---|
| 7,065,089 B2 | 6/2006 | Kuhl et al. |
| 7,596,094 B2 | 9/2009 | Puppa et al. |
| 7,623,531 B2 | 11/2009 | McAllister et al. |
| 2001/0049739 A1 | 12/2001 | Wakayama et al. |
| 2002/0136223 A1 | 9/2002 | Ho |
| 2004/0125805 A1 | 7/2004 | De Clercq et al. |
| 2004/0151180 A1 | 8/2004 | Hu et al. |
| 2004/0174879 A1 | 9/2004 | Basso et al. |
| 2004/0179533 A1 | 9/2004 | Donovan |
| 2004/0202171 A1 | 10/2004 | Hama |

OTHER PUBLICATIONS

Huang et al., "Building Reliable MPLS Networks Using a Path Protection Mechanism", IEEE Communications Magazine, IEEE Service Center, Piscataway, US, vol. 40, No. 3, Mar. 1, 2002, pp. 156-162.

Metz, C., "Layer 2 over IP/MPLS", Jul.-Aug. 2001, vol. 5, Issue 4, pp. 77-82, IEEE.

Sang Jun Park et al., "Congestion problem of IP over MPLS on the label overload", Apr. 22-25, 2001, ATM (ICATM 2001) and High Speed Intelligent Internet Symposium, 2001. Joint 4th IEEE International Conference, pp. 80-84, IEEE.

Knight, P., "Layer 2 and 3 Virtual Private Networks: Taxonomy, Technology, and Standardization Efforts", Communications Magazine IEEE, Jun. 2004, vol. 42, Issue 6, pp. 124-131, IEEE.

International Search Report and Written Opinion dated Oct. 28, 2005 for International Application Serial No. PCT/CA2005/001006, International Filing Date: Jun. 28, 2005, consisting of 11 pages.

European 1st Examination Report dated May 21, 2014 for European Regional Phase Application Serial No. 0 576 1908.2, European Regional Phase Entry Date: Jan. 8, 2007 consisting of 6 pages.

LAYER-2 TO MPLS SERVICE MEDIATION ARCHITECTURE

CROSS-REFERENCE TO RELATED APPLICATION

This application is a continuation of U.S. patent application Ser. No. 13/566,221, filed Aug. 3, 2012, entitled LAYER-2 TO MPLS SERVICE MEDIATION ARCHITECTURE, which is a continuation of U.S. patent application Ser. No. 11/167,883, filed Jun. 27, 2005, entitled LAYER-2 TO MPLS SERVICE MEDIATION ARCHITECTURE, now U.S. Pat. No. 8,289,964, issued on Oct. 16, 2012, which claims priority to U.S. Provisional Application Ser. No. 60/583,381, filed Jun. 28, 2004, entitled LAYER-2 TO MPLS SERVICE MEDIATION ARCHITECTURE, the entirety of all of which are incorporated herein by reference.

FIELD OF THE INVENTION

The invention relates generally to the field of network communications, and more particularly to establishing dynamic end-to-end mediated connections from a Layer-2 network to an MPLS network.

BACKGROUND OF THE INVENTION

The following documents are incorporated by reference:
[SPVC-IW] Swallow draft "Soft Permanent Virtual Circuit Interworking between PWE3 and ATM", draft-swallow-pwe3-spvc-iw-00.txt
[PWE3-CONTROL] Martini, L., et al., "Pseudowire Setup and Maintenance using LDP", draft-ietf-pwe3-control-protocol-05.txt, December 2003
[L2VPN-SIG] Rosen, E., Radoaca, V., "Provisioning Models and Endpoint Identifiers in L2VPN Signaling", draft-ietf-l2vpn-signaling-00.txt
[VPN-AUTO-DISCOVERY] Ould-Brahim, H., Rosen, E., Rekhter, Y., "Using BGP as an Auto-Discovery Mechanism for Provider-Provisioned VPNs", draft-ietf-l3vpn-bgpvpn-auto-00.txt
[BGP-L2VPN-AD] Radoaca, Unbehagen, P., et al., "BGP-based Auto-Discovery for L2VPNs", work in progress, draft-hlmu-l2vpn-bgp-discovery-00.txt
[SM-SCOPE-REQ] "Service Mediation scope and requirements", mpls2004.010.00
[SHAH-QOS] Shah, H., Ould-Brahim, H., Metz, C., "QoS Signaling for PWE3", draft-shah-pwe3-pw-qos-signaling-00.txt, work in progress Layer-2 protocols such as Frame Relay and Asynchronous Transmit Mode ("ATM") were developed with the intent of supporting voice and data communications in service provider networks. Consequently, Layer-2 legacy equipment is widely deployed in existing networks. More recently, service providers have been deploying Internet Protocol ("IP") and Multi-Protocol Label Switching ("MPLS") based equipment. Since it would be quite costly to deploy parallel networks, service providers often deploy IP and MPLS based equipment in the same network with legacy equipment based on Layer-2 protocols.

One provisioning model for a network that includes both ATM/FR equipment and IP/MPLS equipment is the unmapped mode. The unmapped mode requires that calls originating from the Layer-2 domain encode information that identifies the target Forwarder and the destination MPE in the MPLS domain. The Forwarder located on the MPE side is identified using Layer-2 related information such as port number, VPI, VCI, and DLCI values. Forwarder identifiers at the MPE and the IP address of the MPE are taken exclusively from the Layer-2 information carried within the native Layer-2 call. The attachment identifiers on the MPE represent information relevant to the Layer-2 network being mediated. The native Layer-2 address represented by the Calling Party Number (in this case the ATM NSAP address) encodes the IP address of the destination MPE and is assigned a specific address format code that indicates that the address contains an IP address. During the signaling phase the mediation function screens the Called Party Information Elements and extract the IP address, the port number and the VPI.VCI values. The MME screens the AFI and ICP from the received call, extracts the IP address representing the loopback address of the destination MPE, and establishes a pseudowire to that MPE. A TAII is constructed from the information carried within the NSAP address (in this case the ESI—End System Identifier) and the SPVC IE (VPI.VCI/DLCI values). An Example of the unmapped mode solution is described in [SPVC-IW], which is limited to ATM technology. However, the unmapped mode has some disadvantages.

The unmapped mode disadvantageously restricts the set of Forwarders on the MPE devices to only those that are relevant to the Layer-2 network. Indeed, it is not possible for the MPLS operator to configure two separate Forwarders for the same mediated service on two different MPEs with the same or different VPI.VCI/DLCI values or port numbers. Neither is it possible for the unmapped mode to support scenarios where an Ethernet port is backing up a primary ATM port on the MPE, or an ATM port is upgraded to an Ethernet port without reconfiguring all the Layer-2 connections on the Layer-2 network domain destined to that MPE. Further, it is not clear how the unmapped mode supports other addressing plans such as E.164 and X.121 which can still be found in some Frame Relay networks today (since this mode requires encoding an IP address of the MPE onto the native Layer-2 address information). Finally, the unmapped mode does not offer the ability to perform address mobility within the MPLS network such as relocating the attachment identifiers to different ports, or to different MPEs, or even to different MPLS networks without requiring modifications to these identifiers.

SUMMARY OF THE INVENTION

In accordance with the invention a mapped mode is employed to establish dynamic end-to-end mediated connections from a Layer-2 domain to an IP/MPLS domain. In one embodiment apparatus operable to provide service mediation in a network having a Layer-2 domain and an MPLS domain includes: in the Layer-2 domain, at least one Layer-2 provider edge device in communication with a first customer site; and at least one Layer-2 edge device in communication with the Layer-2 provider edge device; and in the MPLS domain, at least one MPLS mediation edge device in communication with the Layer-2 edge device; and at least one MPLS provider edge device in communication with both the MPLS mediation edge device and a second customer site, the MPLS mediation edge device including logic operable to resolve associations between one of the Layer-2 edge devices and one of the MPLS provider edge devices.

In another embodiment of the invention a method for providing service mediation in a network having a Layer-2 domain and a Multi-Protocol Label Switching ("MPLS") domain, includes the steps of: receiving a prompt to setup a connection; and resolving an association between a Layer-2 edge device disposed in the Layer-2 domain and a MPLS provider edge device disposed in the MPLS domain, thereby identifying a connection that traverses both the Layer-2 domain and the MPLS domain.

One advantage of the mapped mode is the flexibility it provides in identifying the Forwarder on the MPLS network. The Forwarder identifiers on the MPE can encode a Layer-2 address that is routable within the Layer-2 network. With respect to the MPLS network, the Layer-2 address is treated as a bit string. In particular, the MPLS network need not have any knowledge that the bit string contains a Layer-2 address, nor that the MPLS network is required to know what type of address is being used. Further, no modifications are required to existing pseudowire/L2VPN signaling mechanisms.

Another advantage of the mapped mode is that it does not require the L2PE and the native Layer-2 address to encode and to know a priori the IP address of the MPE. Thus, this mode can support addressing plans other than ATM NSAP and provides address mobility on the MPE side. It also follows that the mapped mode can take advantage of an auto-discovery mechanism where IP addresses of MPEs are discovered by MMEs along with their associated set of attachment identifiers. Another advantage of this model is that it offers benefits of using Generalized ID FEC as described in [L2VPN-SIG], including service mobility, service resiliency with different AII, and offloads the operator from managing, on the MPLS network, Forwarder identifiers that are relevant only to the Layer-2 network.

In an alternative embodiment an auto-discovery mechanism is employed to facilitate the mapped mode. Auto-discovery enables the Provider to support service endpoint mobility of the Layer-2 endpoints residing on the MPLS core network. Further, auto-discovery enables the MME to dynamically learn the set of remote endpoints with their MPE IP addresses. Auto-discovery also enables the L2PE to use any native layer 2 addressing plan without requiring synchronization between the MPLS core network management and Layer-2 network operations in terms of address management of the MPE devices (i.e., any change to MPE addressing, etc does not require configuration changes to the layer 2 network connections). Further, for calls originating from the MPEs and destined to the Layer-2 networks, the use of an auto-discovery mechanism allows the MPEs to discover the set of MME addresses and the set of AGIs supported within these MMEs.

DETAILED DESCRIPTION OF THE INVENTION

Figure 1:
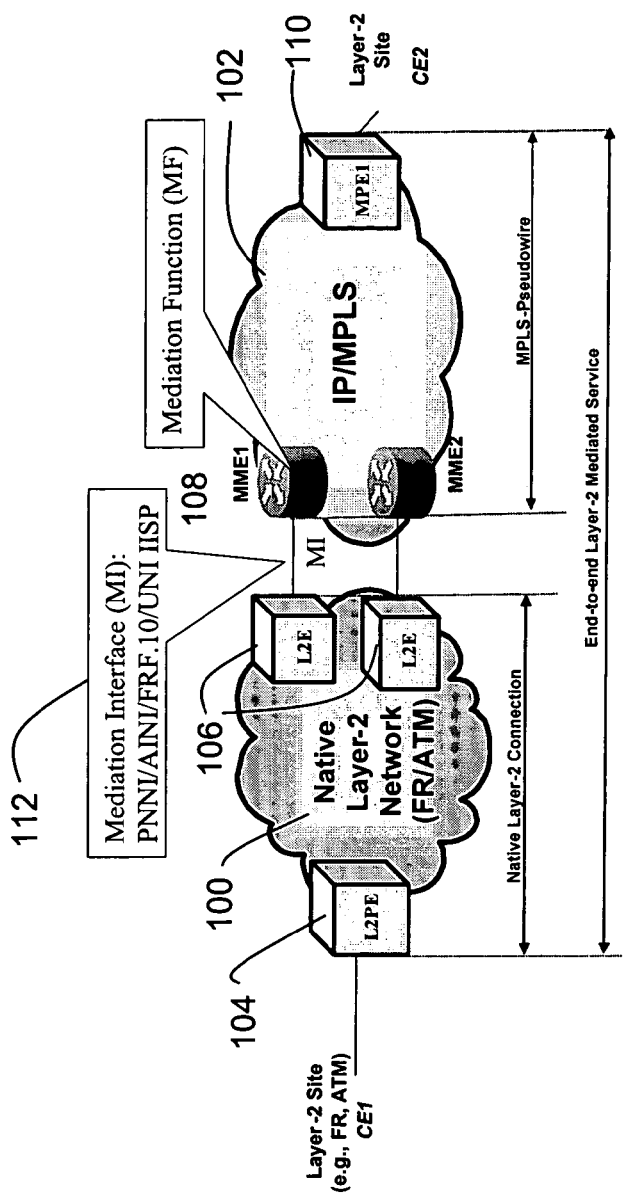
FIG. 1 is a network reference diagram for Layer-2 to MPLS Service Mediation.

FIG. 1 illustrates a network reference diagram for Layer-2 to MPLS Service Mediation. The network includes at least one native Layer-2 domain (100) which is in communication with an MPLS domain (102). The native Layer-2 domain employs Frame Relay or ATM, and includes a Layer-2 Provider Edge ("L2PE") device (104) and Layer-2 Edge ("L2E") devices (106). The MPLS domain includes MPLS Mediation Edge ("MME") devices (108) and an MPLS Provider Edge ("MPE") device (110). The MPE (110) interconnects customer sites that are attached to the MPLS domain (102). The L2Es (106) and MMEs (108) interconnect the Layer-2 domain with the MPLS domain. The MPE and MMEs may, in practice, be the same type of device. The L2PE (104) is a Layer-2 switch which interconnects customer sites that are attached to the Layer-2 domain. The L2Es (106) are Layer-2 devices that interconnect to the MMEs (108) via a Mediation Interface ("MI") (112). The MI could be based on, for example, FRF.10/X.76, PNNI, and AINI.

In accordance with the invention, an end-to-end connection is established using native Layer-2 signaling, if any, in the Layer-2 domain (100), and PWE3 signaling protocols in the MPLS domain (102). The service is "mediated" in the sense that native Layer-2 signaling is terminated at the MME (108), which performs a Mediation Function, and a new domain, i.e., pseudowire, is established across the MPLS domain. Setup of a mediated service requires associating a Forwarder at one endpoint, e.g., L2PE (104), with a Forwarder at the corresponding endpoint, e.g., MPE (110). Since a mediated service is constructed from two domains, the end to end mediated connection can be identified by the following tuple:

{<CIP,CDP>, <<MME IP Address, AGI, AII at MME>, <MPE IP Address, AGI, AII at MPE>>};
where:
"CIP" is the Calling End Party;
"CDP" is the Called End Party;
"AGI" is the Attachment Group Identifier; and
"AII" is the Attachment Individual Identifier,
and where with respect to the Layer-2 network, the Layer-2 connection is established between CIP and CDP Forwarders.

Figure 2:
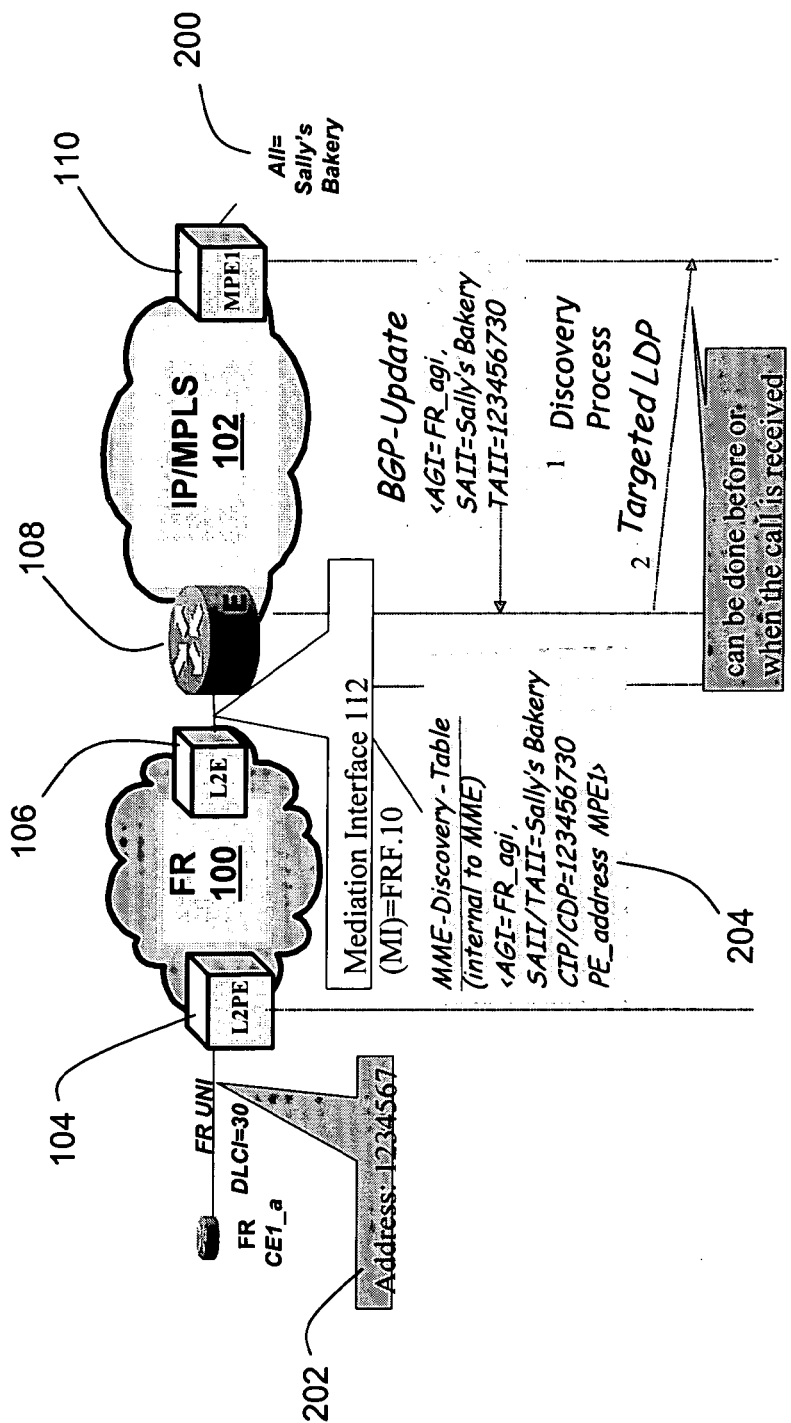
FIG. 2 illustrates the discovery phase of the mapped mode.

Referring now to FIG. 2, in a mapped mode of service provisioning the Layer-2 calls carry information that maps to one or more target Forwarder identifiers using their associated MPE addresses. The identifiers need not necessarily have a relationship to the Layer-2 network, which may be advantageous because it may be desirable to setup a mediated service between two Forwarders, one on the Layer-2 network and the other on the MPLS network, that have no relationship between them in terms of Forwarder identification and do not have knowledge on what device these identifiers are located. For example, an operator may provision an attachment identifier bit string (200) on the MPE side such as "Sally's Bakery," and on the L2PE a Calling Party (CIP) (202) containing the Layer-2 address of "123456789," with VPI.VCI values of 100.20. In order for the "123456789/100.20" Forwarder, i.e., L2PE (104), to establish a mediated connection to the "Sally's Bakery" Forwarder, i.e., MPE (110), the MME (108) must be able to map the CIP/CDP to the "Sally's Bakery" Forwarder. The MME also needs to know on which MPE "Sally's Bakery" is located.

The mapped mode employs a mapping function at the MME (108) to resolve the association between CIP/CDP and <SAII/TAII, MPE-IP address> values, and vice versa. This mapping can be provisioned at the MME or dynamically discovered during either an auto-discovery phase or a signaling phase, thereby producing an MME discovery table (204). The mapping function can be based on the Calling Party Information or the Called Party information or both. In the case of a mapping based on called party information, and for attachment identifiers on the MPE that are non Layer-2 address based, i.e., do not encode information such as NSAP addresses, the Called Party number must correspond one-to-one to the Target Attachment Identifier ("TAI"). Using the called party information the operator will provide, for each Forwarder identifier on the MPE, a corresponding Layer-2 address and its associated SPVC information—VPI.VCI, DLCI values. A potentially more scalable approach is for the MME to use the Calling Party Information, i.e., Calling Party Number and SPVC IE, to guide the mapping function to which Target Attachment Individual Identifier ("TAII") and MPE IP address to use (for calls originating from the Layer-2 network), rather than using the Called Party Information. In this more scalable approach the Called Party information ("CDP") is only required to represent information about reaching the MPLS network through a given set of MMEs. For example, if the TAII is "Sally's Bakery," and the Calling Party Information is 123456789/100.20, and the MME is in the "North America" MPLS region, then calls originating from 123456789/100.20 will be sent to a called party that represents the "North America" region. When the Layer-2 calls reach the MMEs then the mapping function to "Sally's Bakery" requires only the calling party information "123456789/100.20."

If a BGP-based auto-discovery mechanism is used for mapping, the MPE (110) is configured with the Source Attachment Individual Identifier ("SAII") and TAII, which are distributed by BGP to the set of MMEs (108). In the illustrated embodiment the SAII will indicate "Sally's Bakery" (the actual forwarder identifier on the MPE) and the TAII is a bit string identifier containing the actual Calling Party Information (CIP). In this case it encodes the NSAP address and the VPI.VCI, i.e., 123456789100.20, configured on the L2PE. This approach keeps the relevancy of Layer-2 related information such as called party number including the VPI.VCI, etc only to the Layer-2 network, and it decouples the actual called party information from the MPE forwarder information.

In order for the Layer-2 signaling to reach the set of MMEs (108), the MPLS domain needs to be reachable from the Layer-2 domain. This may be accomplished by provisioning Layer-2 prefix addresses which are routable within the Layer-2 domain. For ATM, NSAP summary addresses are configured at the edge device (L2E (106) in the case of AINI, MME (108) in the case of PNNI). The Layer-2 domain, and particularly the L2PE, has a view of which MME node it can reach. The prefix address could represent the entire MPLS domain, or distinct network regions, or specific nodes, i.e., MPEs.

In the case of Frame Relay, apart from use of FRF.8, destination nodes, distinct network regions, or even the entire MPLS network can be assigned standard Layer-2 addresses of X.121 or E.164 addressing plans. The prefix address can relate to the FRF.10 interface point when such interface is used. One possible mechanism for routing Frame Relay calls to the MMEs within the Frame Relay domain is to use hunt group servers. Hunt group servers can be assigned the appropriate prefix address for the MPLS region to which they will direct the calls. Consequently, when a frame relay call is initiated in the Layer-2 network that call is routed to the hunt group servers which will pass it along to one of the FRF.10 interfaces (MME).

In the case of calls originating from the MPLS domain (102), the set of MMEs need to be reachable from the MPLS domain, particularly from the set of MPEs (110). The MPEs can be configured, or auto-discovered, with a list of potential MME IP addresses to use. An MPE that intends to place a call, e.g., an LSP through sending the Label Mapping, will select a particular MME given a local policy.

One framework for BGP-based auto-discovery is described in [VPN-AUTO-DISCOVERY]. Detailed BGP-based auto-discovery procedures for L2VPNs are documented in [BGP-L2VPN-AD]. The auto-discovery proceeds by having each MPE distributing its set of <SAII,TAII> tuples with itself as the BGP next hop and with a set of export route target values. In most common scenarios the MMEs and MPEs will be clients of a set of BGP route reflectors which will distribute L2VPN information to them. The MMEs are configured with an import policy that imports NLRIs containing attachment identifiers that are intended to be mediated. Once the information is received, each MME will record the actual IP address of the remote MPE and its related set of attachment circuits.

Figure 3:
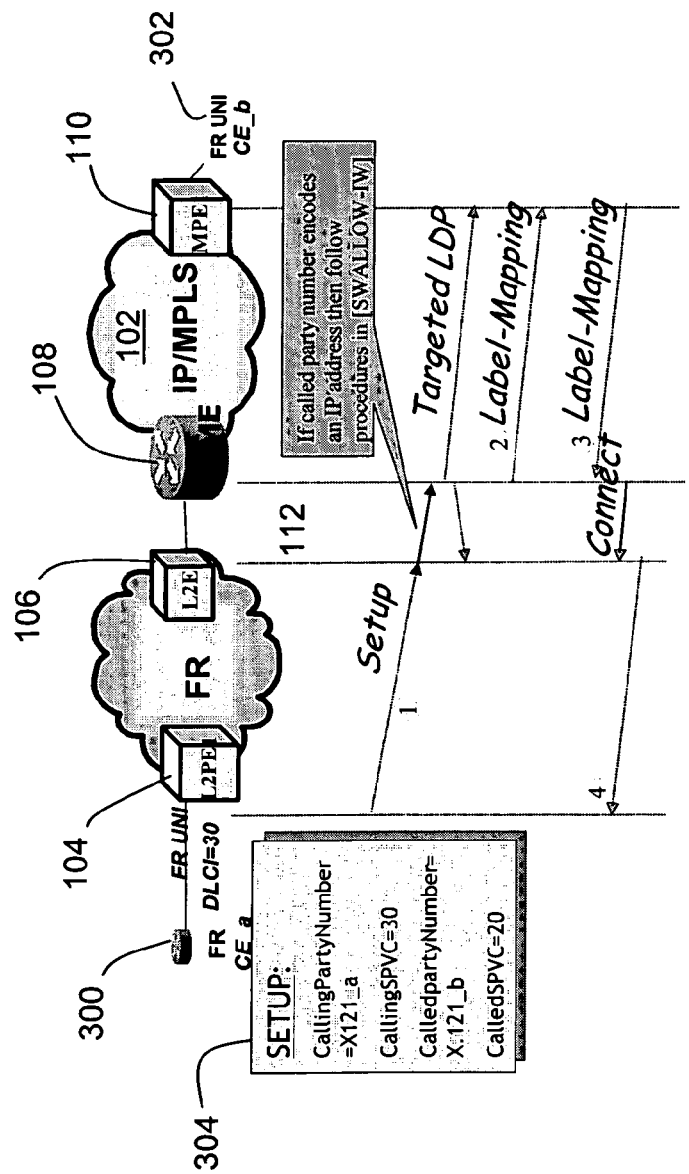
FIG. 3 illustrates the signaling phase of the mapped mode.

FIG. 3 illustrates an example of signaling for mediation between two frame relay endpoints (300, 302) across the MPLS domain (102). An L2PE (104) initiates establishment of a mediated Layer-2 connection SETUP (304) using native Layer-2 signaling protocols. The SETUP is provided to the remote attachment circuit or remote MPE (110). It should be noted that no special knowledge is required at the L2PE regarding the mediated nature of the service. Further, the MME should be in ready state able to receive incoming calls from the Layer-2 network and will have the following information already available:

1) The list of forwarder identifiers. In this case the MME will build a table (204 FIG. 2) of <SAII, TAII, MPE IP addresses>. The SAII is the forwarder identifier on the MPE side. The TAII point to Calling Party Information elements, i.e., combination of Calling Party Number and SPVC IE; and
2) The list of IP addresses of the destination MPEs corresponding to the list of <SAII,TAII>.

For the Frame Relay Layer-2 network the calling and called addresses are of either the E.164 or X.121 addressing plans (assuming FRF.8 is not used). In the case of an ATM service, the calling and called addresses are NSAP based addresses. The call is then routed to the L2E (106) and subsequently to the MME (108) which will perform the following functions:

1. The MME will screen the Layer-2 information carried within the SETUP message and perform normal Layer-2 functions (e.g., CAC, QoS, etc) at the MI (112). If these functions fail then the call is cleared. If not then the following steps are performed.
2. For ATM the MME will screen the Called Party Number and particularly the AFI and ICP values. If the AFI and ICP values indicate values of "35" and "0002" then the called party number encodes the IP address of the destination MPE. The mediation function will then operate using the unmapped mode. The MME extracts the ESI value and combines it with information from the SPVC IE to construct the TAII. Detailed procedures for this mode are described in [SPVC-IW].
3. For calls that do not encode an IP address in their Called Party Number, the MME will screen the Calling Party Information Elements (Calling Party Number and SPVC IE). That information is then compared to the list of AIIs learned (or configured) from the set of MPEs.
4. If a match is found then the MME will extract the AII (which is the actual forwarder identifier on the MPE side) and its corresponding IP address of the destination MPE. This AII becomes the TAII with respect to the MME.
5. The MME establishes a targeted LDP session to the remote MPE if one does not already exist.
6. The MME will format the Generalized ID FEC TLV (GID) where the TAII field is the forwarder identifier of the attachment circuit on the MPE, and the SAII is built either from the actual source address of the call, or is taken from the list of available AII residing on the MME. Once the GID is constructed the MME will send its label mapping to the MPE indicating its intention to establish a pseudowire to the TAIL 7. Upon receiving the Label Mapping, the MPE follows the procedures described in [PWE3-CONTROL] and if the Label Mapping is accepted it initiates a reverse label mapping to the MME.
8. Once the label mapping is received from the MPE, the MME will format a native Layer-2 connect/accept message destined to the remote L2PE and the end to end Layer-2 connection is established.

It is also possible to establish a mediated service where the MPLS domain, particularly the MPE, initiates the signaling procedures instead of the Layer-2 domain. In this mode of operations each MPE is provided with a list of MMEs to be used for mediation purposes. This list can be configured or auto-discovered. Once a particular MME is selected, the MPE establishes a targeted LDP session to that MME and initiates the signaling procedures as follows:

1. The MPE builds the Generalized ID FEC with a TAII that encodes the actual Called Party Number. The Called Party Number represents the address in the Layer-2 network of the L2PE endpoint.
2. The MPE provides additional information that can be used to construct the called SPVC IE such as VPI.VCI, DLCI numbers, etc. This information can be encoded in a separate TLV.
3. The MPE provides sufficient information to the MME about QoS related information of the mediated service. One example of QoS procedures that can be used are described in [SHAH-QOS].
4. The SAII encodes the actual forwarder identifier of the MPE attachment circuit. That identifier can be any bit string value. The AGI value is the same as in the Layer-2 initiated approach and represents an identifier for the Layer-2 region. Once the Label Mapping is received by the MME, the following procedures are performed:
5. The MME constructs the Called Party Information Elements (CDP) from the TAII value and the SPVC IE from the Service Mediation TLVs and the traffic management descriptor from the QoS TLV.
6. The Calling Party Information Elements (CIP) may contain the Layer-2 prefix address or another address that is assigned for that particular MME. The calling VPI.VCI/DLCI values will indicate an attachment circuit selected for this connection at the MME device.
7. The call is then sent to the destination L2PE which will process the call using normal Layer-2 procedures.
8. If the call is accepted then the L2PE sends its connect or accept message to the MME.
9. The MME will then initiate the reverse label mapping destined to the remote MPE and the end-t0-end mediated connection is established.

Figure 4:
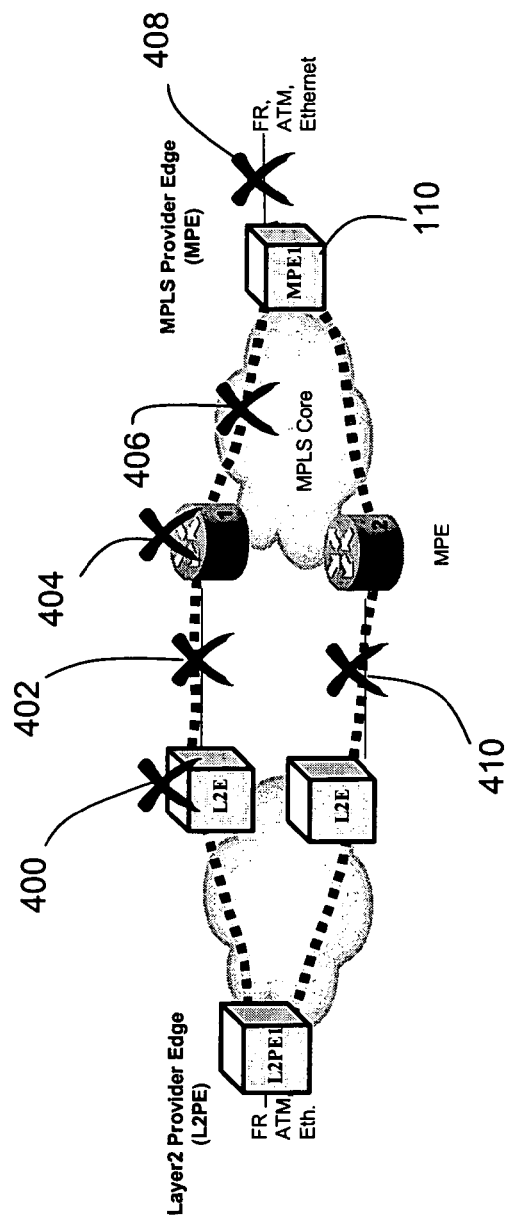
FIGS. 4 and 5 illustrate service resiliency.

FIG. 4 illustrates potential points of failure of the mediation architecture. Resiliency techniques may be employed in response to failures. Resiliency in the Layer-2 domain may also be employed in response to failures, but is a function of the Layer-2 network and is therefore well known in the art. In case of failure of the MI, L2E, or MME failures depicted as (400, 402 and 404, respectively), the call is cleared and a new call is rerouted to an alternate MME (410), which will process the call according to steps described in the signaling section. In the case of ATM, automatic rerouting of connections upon network failures can be achieved by PNNI with the primary and secondary MME configured with the same NSAP summary address. As long as a suitable path exists between the calling PNNI node and the alternate MME node, PNNI can recover from any link or node failure in order to complete the call to the MME. In the case of AINI, a similar rerouting mechanism can be used. If the AINI link fails then the summary address provisioned against the AINI link is withdrawn from the PNNI network. Alternate MMEs can be provisioned with summary addresses to provide redundancy capabilities. In the case of Frame Relay, the Layer-2 network will have to select an alternate FRF.10 interface. If hunt group servers are used within the Layer-2 network and in the scenario that a particular FRF.10 interface (to the MME) becomes unavailable, the hunt group server will be notified of the failure and a new call will be routed to an alternate MME.

For calls originating from the MPLS network, a failure (404) of the MME will cause a global repair of the mediated connection. In this case, the initial Layer-2 call is cleared and the service label is released. The MPE (110) will then select an alternate MME (410) based on some internal policy such as the proximity (select the closest MME), or availability (selects the one that is available), or in rotary mode, or based on some predefined MME preferences.

A failure beyond the MME such as failure points (406) and (408) may cause the pseudowire to be released and therefore the mediated service to be cleared. It may happen however that the MPLS domain will have deployed recovery mechanisms such as FRR. In this case, failures of the MME-MPE tunnels can be locally repaired without affecting the end to end mediated service.

Figure 5:
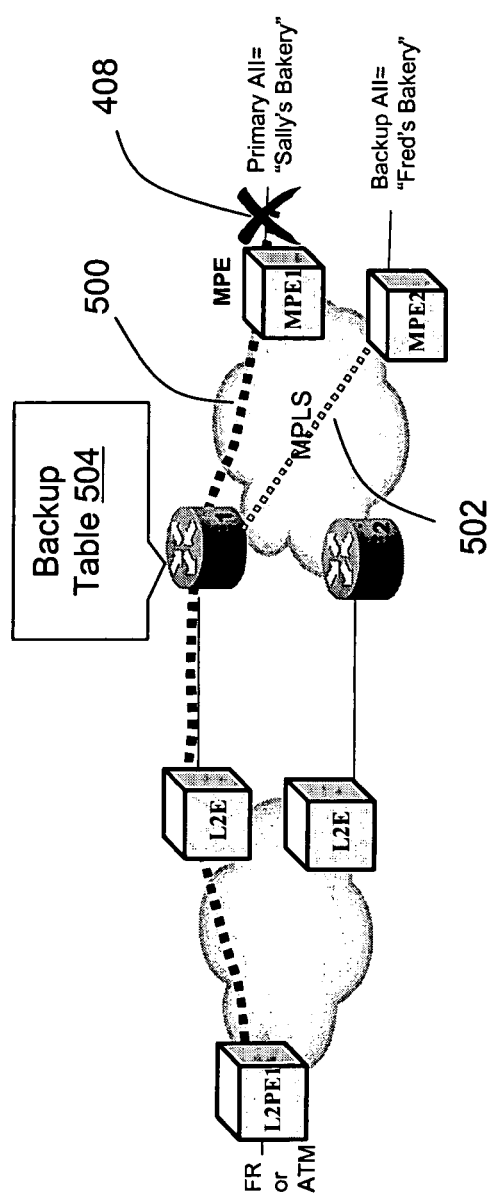

FIG. 5 illustrates a primary link or MPE failure (408). In this case, the mediated service is configured with a primary attachment circuit (500) and a backup attachment circuit (502) on same or different MPE. The primary and backup attachment circuit identifiers are unique within the AGI. The MME will build a backup table (504) of <primary AII, Backup AII> and information regarding the IP addresses of the primary and backup MPEs. This table can be populated by employing the auto-discovery mechanism or can be manually configured. It should be noted that there is no restriction on the type of backup identifier to be used or the service type of the backup. An ATM VC port can be backed up by an Ethernet VLAN or raw Ethernet port. Also note that a given primary may be associated with multiple backup attachment circuits.

Selection of a backup attachment circuit by the MME can be a local policy at the MME, or can be guided by information advertised by each backup MPE. For example each backup attachment circuit might indicate a preference level. Upon failure of the primary attachment circuit (500) (or the primary MPE) the MME may decide to clear the Layer-2 call and subsequent calls will be directed to the backup attachment circuit (502). Another option is for the MME to perform a local repair and establish a pseudowire to the backup attachment circuit without impacting the Layer-2 connection established on the Layer-2 network.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:
1. A system for providing service mediation in a network having a first domain and a second domain, the system comprising:
an edge device of the second domain, the edge device of the second domain being in communication with an edge device of the first domain; and a mediation edge device of the second domain, the mediation edge device being in communication with the edge device of the second domain and configured to resolve an association between the edge device of the first domain and the edge device of the second domain without reference to an address encoded by the edge device of the first domain to thereby identify a destination in the second domain for a connection that traverses both the first domain and the second domain.

2. The system of claim 1, wherein the mediation edge device is further configured to resolve the association between the edge device of the first domain and the edge device of the second domain using a VPN auto-discovery mechanism.

3. The system of claim 1, wherein the first domain is a Layer-2 domain and the second domain is a Multi-Protocol Layer Switching (MPLS) domain.

4. The system of claim 3, wherein the first domain is one of a frame relay domain, an Asynchronous Transfer Mode (ATM) domain and an Ethernet domain.

5. The system of claim 3, wherein the mediation edge device is further configured to resolve an association between the edge device of the first domain and the edge device of the second domain by resolving at least one association between connection endpoint information and a Source Attachment Individual Identifier/Target Attachment Individual Identifier MPLS provider edge address (SAII/TAII, MPE-IP address).

6. The system of claim 1, wherein the mediation edge device is further configured to resolve an association between the edge device of the first domain and the edge device of the second domain by reading a pre-configured table of associations.

7. The system of claim 6, wherein the pre-configured table of associations comprises at least one mapping based on connection source information.

8. The system of claim 6, wherein the pre-configured table of associations comprises at least one mapping based on connection destination information.

9. The system of claim 1, wherein the mediation edge device is further configured to configure a primary attachment circuit and a backup attachment circuit.

10. The system of claim 9, wherein the mediation edge device is further configured to dynamically build a backup table comprising primary attachment identifiers, backup attachment identifiers and address information for primary and backup edge devices of the second domain.

11. The system of claim 1, further comprising:
in the first domain:
a provider edge device of the first domain in communication with a first customer site; and
at least one other edge device of the first domain in communication with the provider edge device of the first domain; and
in the second domain:
a provider edge device of the second domain in communication with the mediation edge device of the second domain and with a second customer site.

12. The system of claim 11, wherein the mediation edge device of the second domain is configured to resolve an association between the edge device of the first domain and the edge device of the second domain by resolving an association between the provider edge device of the first domain and the provider edge device of the second domain.

13. The system of claim 12, wherein the first domain is a Layer-2 domain and the second domain is a Layer-x domain where "x" is greater than 2.

14. The system of claim 12, wherein the first domain is a Layer-2 domain and the second domain is a Multi-Protocol Layer Switching (MPLS) domain.

15. The system of claim 14, wherein the first domain is one of a frame relay domain and an Asynchronous Transfer Mode (ATM) domain.

16. The system of claim 14, wherein the mediation edge device of the second domain is configured to resolve an association between the edge device of the first domain and the edge device of the second domain by resolving at least one association between connection endpoint information and a Source Attachment Individual Identifier/Target Attachment Individual Identifier MPLS provider edge address (SAII/TAII, MPE-IP address).

17. The system of claim 11, wherein the mediation edge device comprises a pre-configured table of associations.

18. The system of claim 17, wherein the pre-configured table of associations defines at least one primary attachment circuit and at least one backup attachment circuit.

19. A mediation device for providing service mediation in a network having a first domain and a second domain, an edge device of the second domain being in communication with an edge device of the first domain, the mediation device being in communication with the edge device of the second domain and configured to resolve an association between the edge device of the first domain and the edge device of the second domain without reference to an address encoded by the edge device of the first domain to thereby identify a destination in the second domain for a connection that traverses both the first domain and the second domain.

20. The mediation device of claim 19, wherein the mediation device is further configured to resolve the association between the edge device of the first domain and the edge device of the second domain using a VPN auto-discovery mechanism.

21. The mediation device of claim 19, wherein the mediation device is further configured to resolve an association between the edge device of the first domain and the edge device of the second domain by resolving at least one association between connection endpoint information and a Source Attachment Individual Identifier/Target Attachment Individual Identifier MPLS provider edge address (SAII/TAII, MPE-IP address).

22. The mediation device of claim 19, wherein the mediation device is further configured to resolve an association between the edge device of the first domain and the edge device of the second domain by reading a pre-configured table of associations.

23. The mediation device of claim 22, wherein the pre-configured table of associations comprises at least one mapping based on connection source information.

24. The mediation device of claim 22, wherein the pre-configured table of associations comprises at least one mapping based on connection destination information.

25. The mediation device of claim 19, wherein the mediation edge device is further configured to configure a primary attachment circuit and a backup attachment circuit.

26. The mediation device of claim 25, wherein the mediation device is further configured to dynamically build a backup table comprising primary attachment identifiers, backup attachment identifiers and address information for primary and backup edge devices of the second domain.

27. The mediation device of claim 19, wherein the mediation device is further configured to resolve an association between the edge device of the first domain and the edge device of the second domain by resolving an association between a provider edge device of the first domain and a provider edge device of the second domain.

28. The mediation device of claim 27, wherein the mediation device is further configured to resolve the association between the provider edge device of the first domain and the provider edge device of the second domain.

29. The mediation device of claim 28, wherein the mediation device is further configured to resolve an association between the edge device of the first domain and the edge device of the second domain by resolving at least one association between connection endpoint information and a Source Attachment Individual Identifier/Target Attachment Individual Identifier MPLS provider edge address (SAII/TAII, MPE-IP address).

* * * * *